United States Patent
Christ et al.

(10) Patent No.: US 10,089,766 B2
(45) Date of Patent: Oct. 2, 2018

(54) METHOD AND SYSTEM OF STITCHING AERIAL DATA USING INFORMATION FROM PREVIOUS AERIAL IMAGES

(71) Applicant: KONICA MINOLTA LABORATORY U.S.A., INC., San Mateo, CA (US)

(72) Inventors: John Randall Christ, Santa Clara, CA (US); Po-Chieh Hung, Cupertino, CA (US)

(73) Assignee: Konica Minolta Laboratory U.S.A., Inc, San Mateo, CA (US)

( * ) Notice: Subject to any disclaimer, the term of this patent is extended or adjusted under 35 U.S.C. 154(b) by 43 days.

(21) Appl. No.: 15/128,224

(22) PCT Filed: Mar. 26, 2015

(86) PCT No.: PCT/US2015/022631
§ 371 (c)(1),
(2) Date: Sep. 22, 2016

(87) PCT Pub. No.: WO2015/199772
PCT Pub. Date: Dec. 30, 2015

(65) Prior Publication Data
US 2017/0124745 A1 May 4, 2017

Related U.S. Application Data

(60) Provisional application No. 61/971,924, filed on Mar. 28, 2014.

(51) Int. Cl.
*G06T 3/40* (2006.01)
*G06T 7/30* (2017.01)
(Continued)

(52) U.S. Cl.
CPC .......... *G06T 11/60* (2013.01); *G06K 9/00657* (2013.01); *G06T 7/11* (2017.01);
(Continued)

(58) Field of Classification Search
CPC ....... G06K 9/00657; G06T 7/11; G06T 7/337; G06T 11/60; G06T 2207/10036;
(Continued)

(56) References Cited

U.S. PATENT DOCUMENTS

| | | | |
|---|---|---|---|
| 5,146,228 | A | 9/1992 | Irani et al. |
| 5,187,754 | A | 2/1993 | Currin et al. |

(Continued)

FOREIGN PATENT DOCUMENTS

| | | |
|---|---|---|
| CN | 101916452 A | 12/2010 |
| CN | 102506824 A | 6/2012 |

OTHER PUBLICATIONS

Yahyanejad et al. ("Incremental, orthorectified and loop-independent mosaicking of aerial images taken by micro UAVs," IEEE International Symposium on Robotic and Sensors Environments, Sep. 17-18, 2011).*

(Continued)

*Primary Examiner* — Yubin Hung
(74) *Attorney, Agent, or Firm* — Buchanan Ingersoll & Rooney PC

(57) ABSTRACT

A method, a computer program product, and a system are disclosed for stitching aerial data using information from at least one previous image. The method includes capturing a plurality of images of the landscape; obtaining, image metadata for each of the captured images; generating, for each of the captured images, a set of transformed images based on the image metadata, comprises: setting a variable for each of the parameters; preparing a plurality of sets of transformed image metadata by applying the variables to the parameters; and preparing the set of transformed images from the captured image based on the plurality of sets of transformed image metadata, respectively; identifying, for each set of transformed images, one of the transformed images by (Continued)

calculating quality of fit to the top level image for each of the transformed images; and assembling a new aerial image based on the plurality of the identified transformed images.

20 Claims, 5 Drawing Sheets

(51) Int. Cl.
  *H04N 5/232*  (2006.01)
  *G06T 11/60*  (2006.01)
  *G06T 7/33*  (2017.01)
  *G06T 7/11*  (2017.01)
  *G06K 9/00*  (2006.01)

(52) U.S. Cl.
  CPC ............ *G06T 7/337* (2017.01); *G06T 3/4038* (2013.01); *G06T 7/30* (2017.01); *G06T 2207/10036* (2013.01); *G06T 2207/20221* (2013.01); *G06T 2207/30188* (2013.01); *H04N 5/23238* (2013.01)

(58) Field of Classification Search
  CPC . G06T 2207/20221; G06T 2207/30188; G06T 3/4038; G06T 7/30; H04N 5/23238
  See application file for complete search history.

(56) References Cited

U.S. PATENT DOCUMENTS

| | | | |
|---|---|---|---|
| 5,878,356 A * | 3/1999 | Garrot, Jr. | G01C 11/02 348/144 |
| 2003/0179923 A1 | 9/2003 | Xiong et al. | |
| 2009/0232415 A1 | 9/2009 | Uyttendaele et al. | |
| 2010/0142814 A1 * | 6/2010 | Damkjer | G06T 5/009 382/167 |
| 2010/0268458 A1 * | 10/2010 | Becker | G01C 23/00 701/532 |
| 2010/0295855 A1 * | 11/2010 | Sasakawa | G06T 3/0031 345/427 |
| 2012/0020571 A1 | 1/2012 | Schultz et al. | |
| 2012/0101784 A1 | 4/2012 | Lindores et al. | |
| 2012/0114229 A1 * | 5/2012 | Zhou | G06T 3/4038 382/164 |
| 2013/0027555 A1 | 1/2013 | Meadow | |
| 2013/0208996 A1 | 8/2013 | Schultz et al. | |
| 2013/0216089 A1 * | 8/2013 | Chen | G06T 7/0002 382/100 |
| 2014/0316616 A1 * | 10/2014 | Kugelmass | G05D 1/101 701/8 |
| 2014/0362174 A1 * | 12/2014 | Fan | G06T 17/05 348/36 |
| 2016/0300375 A1 * | 10/2016 | Beckett | G06T 3/4092 |
| 2016/0373662 A1 * | 12/2016 | Olsen | G06K 9/0063 |

OTHER PUBLICATIONS

Jiang et al. ("Unlimited-size mosaicking of airborne image data," Proc. SPIE 5109, Airborne Reconnaissance XXVII, Aug. 8, 2007).*
International Search Report (PCT/ISA/210) dated Dec. 29, 2015, by the Japanese Patent Office as the International Searching Authority for International Application No. PCT/US2015/022631.
Written Opinion (PCT/ISA/237) dated Dec. 29, 2015, by the Japanese Patent Office as the International Searching Authority for International Application No. PCT/US2015/022631.

* cited by examiner

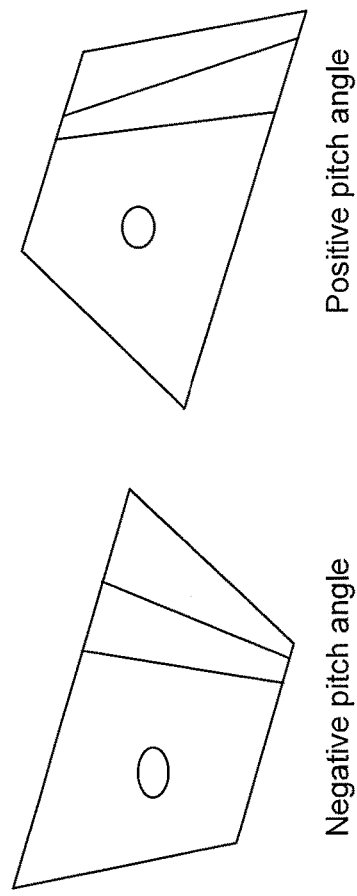
FIG. 4A
No pitch or roll angle (image directly overhead from nadir)
road
tree
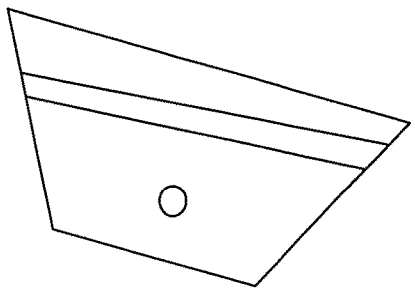
FIG. 4B
Negative pitch angle
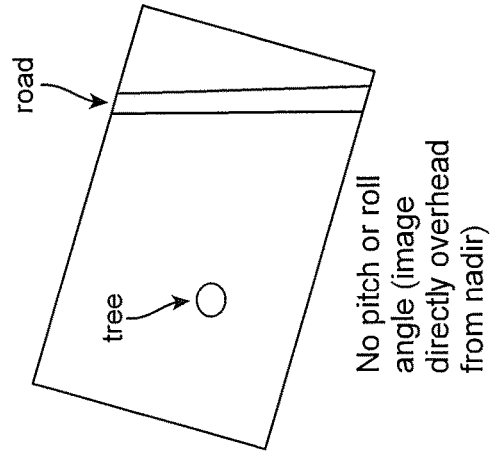
FIG. 4C
Positive pitch angle
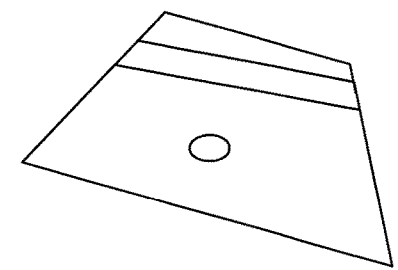
FIG. 4D
Negative roll angle
FIG. 4E
Positive roll angle

METHOD AND SYSTEM OF STITCHING AERIAL DATA USING INFORMATION FROM PREVIOUS AERIAL IMAGES

CROSS-REFERENCE TO RELATED APPLICATIONS

This application claims the benefit of U.S. Provisional Application No. 61/971,924, filed Mar. 28, 2014, the entire contents of which is hereby incorporated herein by reference.

FIELD

The present application relates to a method and system of stitching aerial data using information from one or more previous aerial images.

BACKGROUND

Aerial vehicle can include manned airplanes, rotary type unmanned aerial vehicles (UAV) including helicopters, quadcopters, hexacopters, octocopters or the like, and/or fixed wing UAVs can be used to obtain aerial photographs. While capturing the images, the aerial vehicle may tilt from side to side (roll angle) or from front to back (pitch angle). The time to stitch, for example, to assemble, a plurality of images together to form a single aerial photograph or mosaic image can be several hours, depending on the number of images and the computing power available. Commercial or general aviation aircraft typically use highly accurate gyroscope based attitude sensors, but these can be too heavy and costly for small unmanned aerial vehicles.

Aerial imaging using small UAVs can generate images captured when the aerial vehicle was flying with large pitch and/or roll angles. However, these images can be time consuming to stitch into a mosaic image because of the large number of angles that must be used to generate test images to create the best mosaic result.

To speed up the stitching process, some stitching software will not tolerate large pitch and roll angles commonly encountered by small aerial vehicles, requiring the use of camera gimbal mounts, which can be heavy, relatively expensive, and can cause reliability issues.

SUMMARY

In consideration of the above issues, it would be desirable to have a method and system, of stitching aerial data using information from previous images, which can address some of the limitations set forth above.

In accordance with an exemplary embodiment, a method of stitching aerial data using information from at least one previous image is disclosed, the method comprising: providing a top level image of a landscape from the at least one previous image; capturing a plurality of images of the landscape and storing the plurality of images with image metadata, the image metadata including at least one or more of the following parameters: latitude and longitude, altitude, pitch angle, roll angle, and yaw angles; generating a set of transformed images based on the image metadata, wherein generating the set of transformed images based on the image metadata comprises: setting a variable for each of the parameters; and calculating quality of fit for each of the plurality of images; normalizing the plurality of captured images using the set of transformed images; and assembling a new aerial image based on the plurality of captured images by fitting the plurality of normalized captured images to the top level image.

In accordance with an exemplary embodiment, a computer program product comprising a non-transitory computer readable medium having a computer readable code embodied therein for stitching aerial data using information from at least one previous image, the computer readable program code configured to execute a process, which includes the steps of: providing a top level image of a landscape from the at least one previous image; capturing a plurality of images of the landscape and storing the plurality of images with image metadata, the image metadata including at least one or more of the following parameters: latitude and longitude, altitude, pitch angle, roll angle, and yaw angles; generating a set of transformed images based on the image metadata, wherein generating the set of transformed images based on the image metadata comprises: setting a variable for each of the parameters; and calculating quality of fit for each of the plurality of images; normalizing the plurality of captured images using the set of transformed images; and assembling a new aerial image based on the plurality of captured images by fitting the plurality of normalized captured images to the top level image.

In accordance with an exemplary embodiment, a system for stitching aerial data using information from at least one previous image using images captured from a camera on an aerial vehicle is disclosed, the system comprising: an aerial vehicle configured to: capture images of an area at a plurality of intervals with a multispectral imaging camera; and recording image metadata for each of the captured images; and a computer configured to: provide a top level image of a landscape from a previous image; generate a set of transformed images based on the image metadata, wherein generating the set of transformed images based on the image metadata comprises: setting a variable for each of the parameters; and calculating quality of fit for each of the plurality of images; and normalize the plurality of captured images using the set of transformed images; and assemble a new aerial image based on the plurality of captured images by fitting the plurality of normalized captured images to the top level image.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 4 are image outlines from an aerial vehicle showing positive and negative pitch and roll angles, and wherein the projective transform can be used to convert trapezoidal images to images that appear as if taken from directly overhead, or "nadir", which is the direction pointing directly below a particular location.

DESCRIPTION OF THE PREFERRED EMBODIMENTS

In accordance with an exemplary embodiment, generally, a top level image 100, for example, of an agricultural field, can be generated in the traditional manner using one or more aerial images 110 taken from a satellite or an aerial vehicle. However, if the top level image 100 must be stitched together, for example, from a plurality of aerial images, it may take several hours to complete using only locational information, for example, latitude, longitude, and altitude, for each portion of the stitched image, which can be stored in each section to be used for subsequent rough image position identification.

In accordance with an exemplary embodiment, the top level image 100 can include ground slope and altitude variations obtained from a Geographical Information System (GIS) to be used during image orthorectification as disclosed herein. For example, the top level image 100 can contain location information to be used during subsequent stitching processes. The level of locational information can depend on the source of images for the top level image, for example, if one satellite picture was used or a high altitude aircraft, then only one or a few location information set(s) for the entire field may be available. However, if the top level image 100 was stitched together using a plurality of high resolution aerial vehicle images 110, then locational information for each image will be available. In addition, landmarks with known location coordinates can be marked on the top level image 100 for use later during stitching processes.

Figure 2:
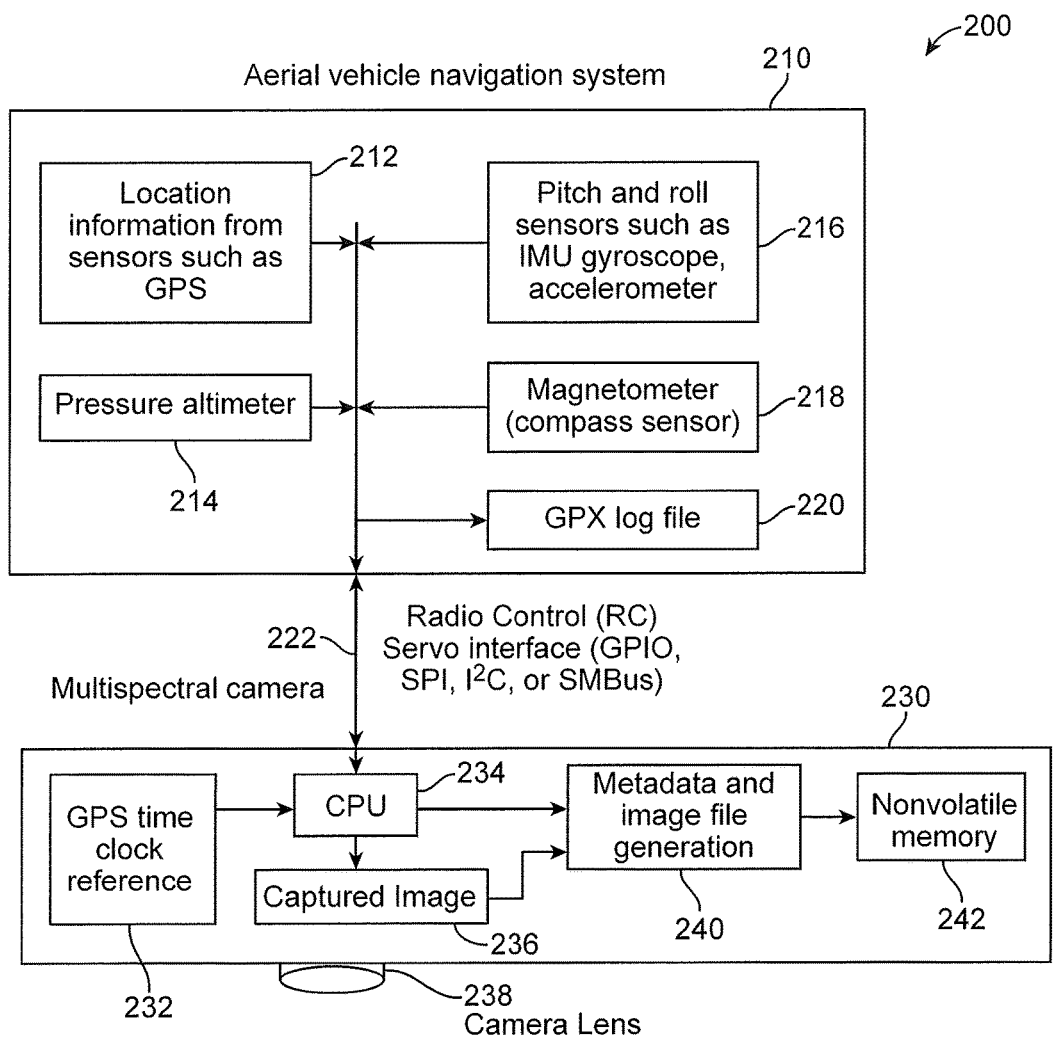
FIG. 2 is a block diagram showing an interaction between an aerial vehicle navigation system or hardware and a camera during aerial imaging in accordance with an exemplary embodiment.

FIG. 2 is a block diagram showing interaction between an aerial vehicle 200 having an aerial vehicle navigation system (or hardware) 212 and a multispectral camera 230 during aerial imaging. As shown in FIG. 2, the aerial vehicle 200 preferably includes an aerial vehicle navigation system 210, which can include a positioning system 212, a pressure altimeter 214, pitch and roll sensors 216, a magnetometer 218, and a GPX log file 220. The aerial vehicle 200 also preferably includes a radio control interface (RC) and a servo interface 224, for example, GPIO, SPI, I²C, or SMBus, which can be configured to send a signal to the navigation hardware (or system) 210 from the camera 230. For example, the signal (not shown) can include entries (or data) from the camera 230, which can be saved in the GPX log file 220.

The aerial vehicle 200 can also include a multispectral camera 230, which can include a GPS time clock reference (or GPS time stamp) 232, a CPU (processing unit) 234, at least one image 236 captured from the camera lens 238, a metadata and image file generation unit 240, and nonvolatile memory 242.

In accordance with an exemplary embodiment, the positioning system 212 can be configured to record locational information and altitude information over the surface with each image for georeferencing and image stitching purposes after the aerial vehicle or aircraft 200 has landed. This positioning system can be a Global Positioning System (GPS), WiFi, or a ground based system such as that developed by Locata Corporation.

In accordance with an exemplary embodiment, the pressure altimeter 214 can be configured to determine altitude based on the measurement of atmospheric pressure. For example, the greater the altitude, the lower the pressure. When a barometer is supplied with a nonlinear calibration so as to indicate altitude, the instrument is called a pressure altimeter or barometric altimeter. For example, in aircraft, an aneroid barometer measures the atmospheric pressure from a static port outside the aircraft.

In accordance with an exemplary embodiment, the pitch and roll sensor 216 can be any type of sensor, which can measure pitch, roll, yaw and/or heave, for example, an IMU gyroscope, and/or accelerometer. The magnetometer (or compass sensor) 218, can be, for example, a magnetic compass contains a magnet that interacts with the earth's magnetic field and aligns itself to point to the magnetic poles. The GPX log file 220 can be a log file, which as the aerial vehicle reaches each GPS waypoint or camera triggers, logs longitude and latitude, attitude, altitude, magnetic heading and GPS time.

In accordance with an exemplary embodiment, FIG. 2 illustrates how the aerial vehicle navigation system 210 and the camera 230 can be configured to synchronize information. For example, both the aerial vehicle navigation system 210 and the camera 230 should maintain a precise clock such as GPS. In accordance with an exemplary embodiment, the time (or time stamp) from the aerial vehicle navigation system clock (not shown) can be saved in the GPS eXhange format (GPX) log file 220 located in the aerial vehicle navigation system 210.

For example, in accordance with an exemplary embodiment, a bi-directional Radio Control (RC) interface 222 can be used to signal the aerial vehicle navigation system 210 to generate an entry in the GPX non-volatile memory 220. The camera 210 preferably contains an accurate time reference, for example, a GPS time stamp 232 can be used when each captured image 236 is saved in the GPX log file 220. When the aerial vehicle lands 200 and image stitching is performed, the information in GPX log file 220 and the image information 240 can be synchronized using the time stamps for each image 236 and correlating to the time stamps in the GPX non-volatile memory 220.

As the aerial vehicle 200 is capturing images 236, location and attitude information obtained from the aerial vehicle's navigation system sensors 212 along with the aerial vehicle navigation system local GPS time stamp 232 can be stored in the GPX non-volatile memory 242 as described above, and image metadata 240 in the camera 230 contains the local camera time stamp. This information can then be used during the stitching process.

In accordance with an exemplary embodiment, the captured aerial vehicle images 236 with location and attitude information are then stitched together utilizing the information from the top level image. The stitching process can involve matching common tie points located in overlapping portions of the captured images and correcting perspective differences caused by magnification differences, off-nadir (non-vertical) camera angles, or terrain elevation variations.

In accordance with an exemplary embodiment, for example, if a circular irrigation system is occluding a portion of the field, image matching points may be obscured, making it more difficult to match control points of multiple images. For example, this can be alleviated by applying reflective tape, reflectors or other identifying markings on the irrigation system for easier identification. When the field is imaged with the easily identified irrigation system, methods can be used to eliminate unwanted images from the field using previously stitched images, or by using surrounding pixels and blending them into the image where the irrigation system resides in the image. It can be appreciated, for example, that these two methods do not allow the grower to use the aerial vehicle image to detect if plants underneath the irrigation system are healthy or require attention such as water, fertilizer, herbicide or pesticide. Another solution to this problem is to help ensure that the irrigation system is always at a parked position or fixed location, and wherein, for example, the irrigation system is not located above a crop before imaging.

Figure 1:
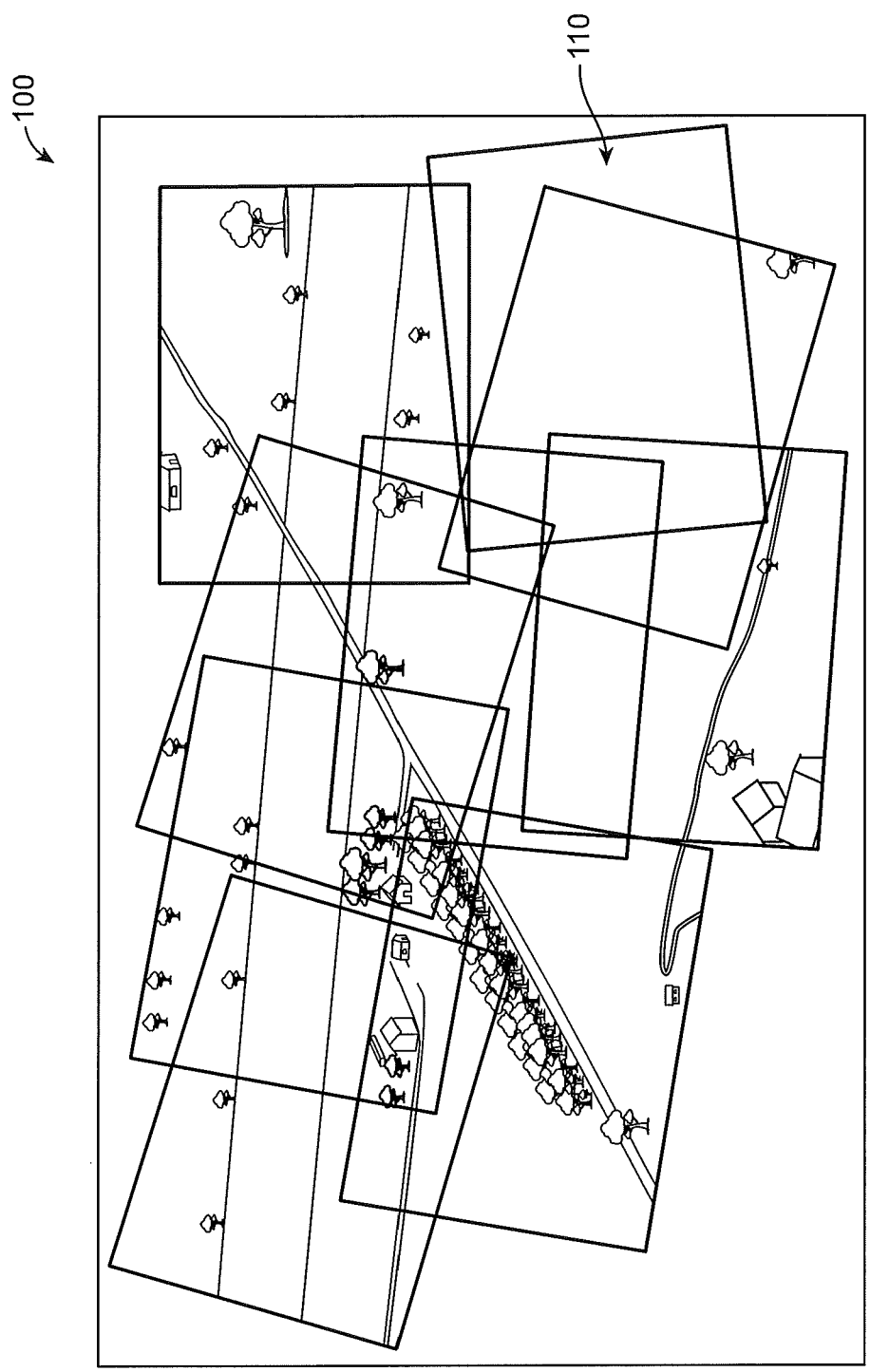
FIG. 1 is an illustration of a stitched image from a plurality of aerial photographs, and wherein rectangles indicate outlines of individual pictures.

In accordance with an exemplary embodiment, the image can be generated from satellite or aerial vehicle images using traditional means for each agricultural field to be imaged. Generation of this image can utilize location information from images taken from the aerial vehicle to speed up the stitching process. The location information for each of the captured images can be used to create the stitched mosaic image using the information stored in the metadata of the mosaic image for later use as shown in FIG. 1.

Figure 3B:
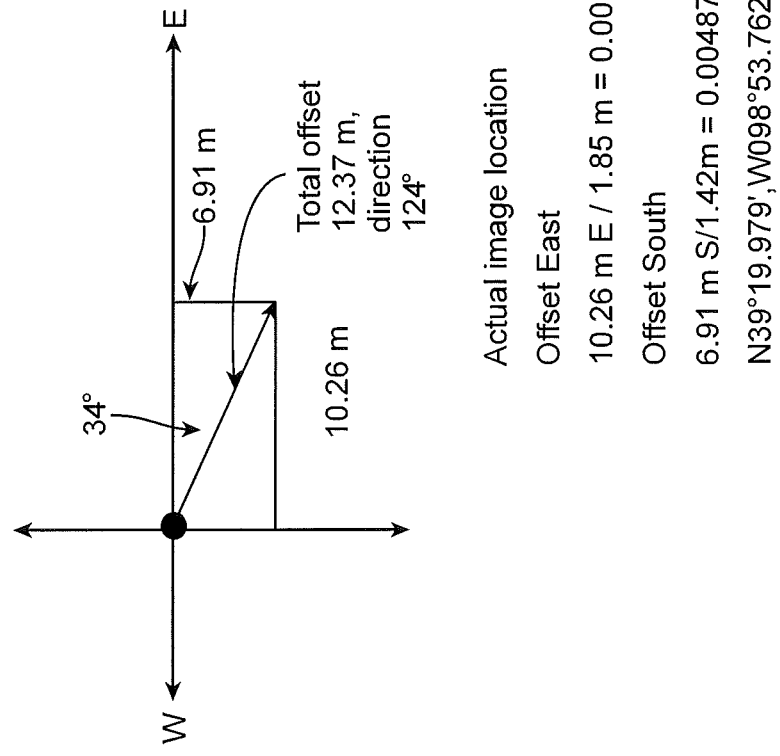
FIG. 3b is an image of an offset used to adjust latitude and longitude coordinates in accordance with an exemplary embodiment.
Figure 3A:
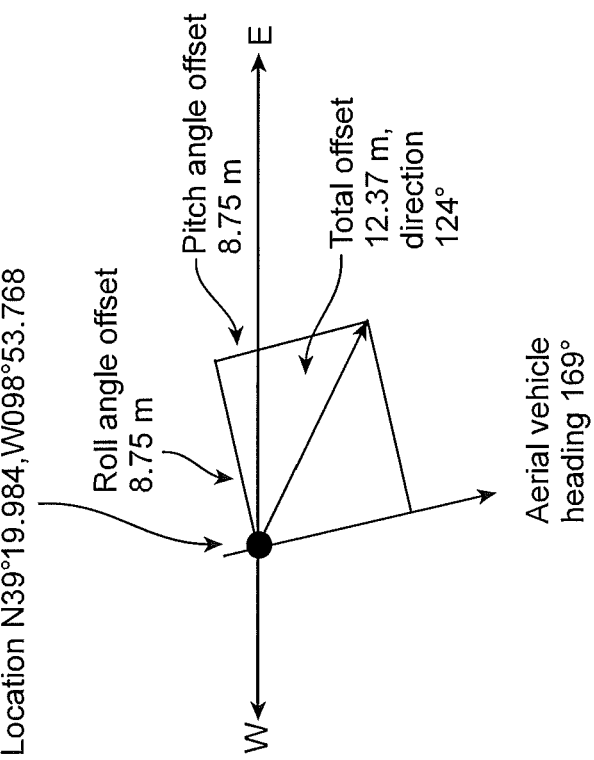
FIG. 3a is an image of a calculation of offset angle and distance in meters based on magnetic heading, pitch and roll angles, and elevation in accordance with an exemplary embodiment.

FIGS. 3a and 3b show how the location coordinates stored in the GPX non-volatile memory can be adjusted based on the aerial vehicle elevation, pitch and roll angle, and magnetic heading to provide an improved location for each individual image in the top level image. It can be appreciated that the disclosure is not limited to the use of magnetic headings as disclosed in FIGS. 3a and 3b, and that, for example, a true heading provide by a GPS system can be used. If a magnetic heading is used, a magnetic declination can be used to convert the magnetic heading to a true heading using, for example, the World Magnetic Model, or the International Geomagnetic Reference Field Model, and inputting the latitude and longitude for the image.

In accordance with an exemplary embodiment, subsequent imaging flights can store location information (for example, latitude, longitude, magnetic heading and altitude) of the aerial vehicle 200 in the GPX non-volatile memory 220 of the aerial vehicle navigation system 210 along with the local GPS time 212, as well as the aerial vehicle approximate attitude (pitch, roll and yaw angles) from the aerial vehicle navigation sensors 216 can be utilized during the stitching process. When each image 236 is captured, a signal can be sent to the aerial vehicle navigation system 210 to store an entry in the GPX non-volatile memory 220. Each camera image 236 contains a local GPS time stamp 232 for correlation to the GPX non-volatile memory time stamp 212. Yaw angles can be detected using Inertial Measurement Unit (IMU) 216 and location information from the aerial vehicle navigation system 210.

In accordance with an exemplary embodiment, methods to normalize images that were captured at angles off-nadir are known and can include perspective transform methods. The known methods for performing this task, are known as image orthorectification.

In accordance with an exemplary embodiment, the stitching process can be performed by using the location data, pitch, roll and yaw information and reducing the processing power and time required to stitch mosaic images after the first mosaic image has been completed. The metadata stored with the first mosaic image such as ground elevation and slope, location information for each area of the image can be used in subsequent mosaic images. The location coordinates of new images taken from the aerial vehicle can be used to roughly locate the new aerial vehicle images to the previously stitched mosaic image. However, location information alone does not account for the pitch, yaw, and roll angle of the new aerial vehicle image, which will affect the actual image location on the ground as illustrated in FIGS. 3a and 3b.

For example, if the GPX non-volatile memory contains an entry with location coordinates N39°19.984,W098°53.768, pitch angle 5°, roll angle 5°, altitude 639 m, heading 169° and time stamp 2014-10-17T18:37:34Z. The camera non-volatile memory can contain an image captured at time stamp 2014-10-17T18:37:34Z. Based on the pitch angle of 5°, the roll angle of 5°, and altitude of 100 m AGL (639−539 ground elevation=100 m AGL), the offset from the location coordinates for the captured image can be calculated using triangulation. In accordance with an exemplary embodiment, the roll angle can cause an offset perpendicular to the heading direction of approximately 8.75 m and the pitch angle of 5° can cause an offset in the heading direction of approximately 8.75 m. Using triangulation, the combined offset from pitch and roll is at an angle of 124° with a distance of 12.37 m. This offset can then be converted to a latitude and a longitude offset and the GPX coordinates can be adjusted accordingly to better locate the position of the image on the top level image. In accordance with an exemplary embodiment, this process is illustrated FIGS. 3a and 3b.

In accordance with an exemplary embodiment, identification of the correct location on the top level image can be accomplished by matching location parameters for the newly captured image to the location parameters stored in the top level image, along with any offset caused by pitch and roll angles. This is a rough identification and can only identify the location on the top level image with meter level accuracy, so the stitching algorithm determines the best match at pixel level accuracy using the algorithm described below. Landmarks (roads, trees, buildings, power poles, and the like) that exist in both the top level image and the newly acquired aerial vehicle image can also be used to identify the location on the top level image. If the location coordinates of the landmark is known, this information can be used in the stitching process for setting the nominal location starting point.

It can be appreciated that traditional stitching methods do not have pitch, roll and yaw information for each image, such that one must try different combinations of these parameters to get the best quality image match to stitch in each image in the overall mosaic. This can be a time consuming process. If the pitch, roll and yaw information is stored in the metadata of each aerial vehicle image, this information can be used to reduce the required rotations of each new aerial vehicle image when stitching in the new image to the overall mosaic.

In accordance with an exemplary embodiment, the combination of the existing mosaic image (with location information, ground slope information, and ground elevation variations) along with location information, pitch, roll, and yaw information from the new aerial vehicle images can reduce the number of angles and transformations that are needed for image stitching a new mosaic image.

In addition, traditional stitching methods start with the assumption that the aerial vehicle is flying level with no pitch, roll or yaw angle and attempt to fit the image into the mosaic using this assumption. If this assumption is correct, the stitching process can complete rather quickly since only a small number of images need to be tested for the best fit in the mosaic image. However, if this assumption fails, the algorithm successively increases pitch and roll angles until a better match is found. For example, if the aerial vehicle is flying with a large pitch or roll angle, this process can be time consuming, which is why some stitching software does not accept large pitch and roll angles during stitching to reduce computer processing unit (CPU) power and processing time requirements.

In accordance with an exemplary embodiment, the disclosure can converge faster on a solution to the best match for a stitched image because the process avoids trying to fit images that are not close to the actual attitude of the aerial vehicle during flight. For example, the use of sensor information to capture the attitude of the aerial vehicle can allow the stitching process to use a set of images around the optimal point and converge on the best match.

FIG. 4 are image outlines from an aerial vehicle showing positive and negative pitch and roll angles, and wherein the projective transform can be used to convert trapezoidal images to images that appear as if taken from directly overhead, or "nadir", which is the direction pointing directly below a particular location. For example, the transforms can include:

a) no pitch or roll angle, image directly overhead from nadir;
b) negative pitch angle;
c) positive pitch angle;
d) negative roll angle; and
e) positive roll angle.

Figure 5:
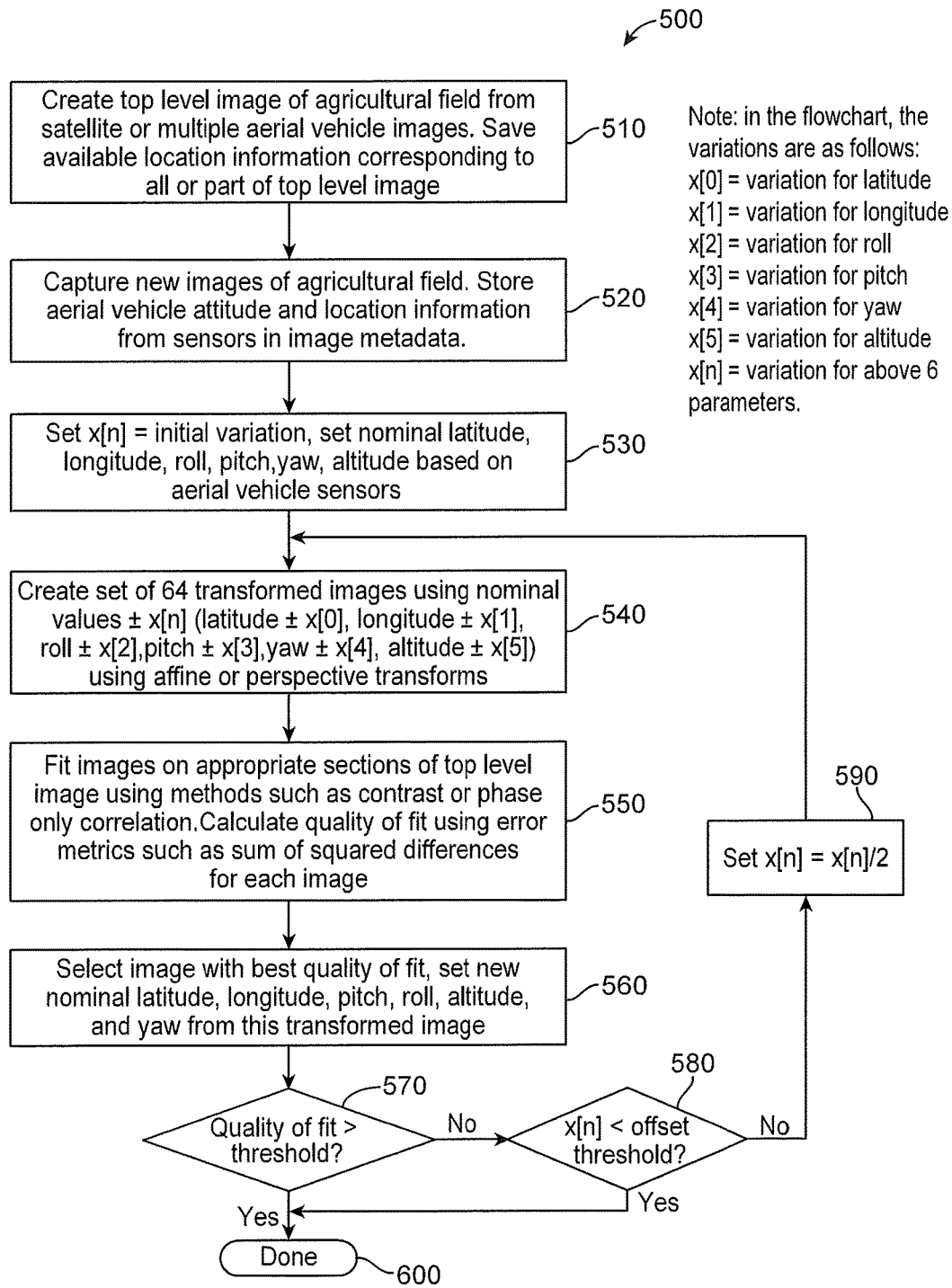
FIG. 5 is a flowchart of image capture and stitching in accordance with an exemplary embodiment.

FIG. 5 is a flowchart of process 500 for image capture and stitching using an aerial vehicle 200, which can be processed on a computer (not shown), the computer including a CPU (Central Processing Unit), a RAM (Random Access Memory), a ROM (Read Only Memory), and operating system.

As shown in FIG. 5, in step 510, a top level image of a landscape, for example, an agricultural field from a satellite or multiple aerial vehicle images is obtained and saved to a computer or processing unit (not shown). The top level image can include locational information corresponding to all or part of the top level image.

In step 520, new images of the landscape, for example, an agricultural field is captured. The aerial vehicle attitude and location information from the sensors in the captured image's metadata are stored.

In accordance with an exemplary embodiment, in step 530, different variables $x[n]$ for the captured images can be set to include, for example, the initial variations can include (1) nominal latitude, (2) longitude, (3) roll, (4) pitch, (5) yaw, and (6) altitude, which can be calculated and/or obtained from the aerial sensors on the aerial vehicle 200. For example, in accordance with an exemplary embodiment, $x[0]$=variation for latitude; $x[1]$=variation for longitude; $x[2]$=variation for roll; $x[3]$=variation for pitch; $x[4]$=variation for yaw; $x[5]$=variation for altitude; and $x[n]$=variation for all six (6) of the above parameters.

For example, in accordance with an exemplary embodiment, as shown in step 540, a set of 64 transformed images can be generated based on knowledge of the top level image position information and the newly captured image position information, latitude, longitude, roll, pitch, roll, and altitude angles±an initial offset shown as $x[0]$, $x[1]$, $x[2]$, $x[3]$, $x[4]$, $x[5]$, respectively, in the flowchart. For the above example, the nominal position would be N39°19.984, W098°53.768, pitch angle 5°, roll angle 5°, altitude 100 m AGL, and yaw angle is −10°.

In accordance with an exemplary embodiment, the initial $x[n]$ (set empirically) can be set to ±1° for pitch ($x[3]$), roll and yaw angles ($x[2]$ and $x[4]$), ±5 m for altitude ($x[5]$), and 0.005' for latitude and longitude ($x[0]$ and $x[1]$), so the set of 64 images would use the following parameters:

A. Latitude N39°19.984±0.005'
A1. (low) N39°19.984−0.005'=N39°19.979
A2. (high) N39°19.984+0.005'=N39°19.989
B. Longitude W098°53.768±0.005'
B1. (low) W098°53.768−0.005'=W098°53.763
B2. (high) W098°53.768+0.005'=W098°53.773
C. Altitude 100 m AGL±5 m
C1. (low) 100−5=95 m
C2. (high) 100+5=105 m
D. Pitch angle 5°±1°
D1. (low) 5°−1°=4°
D2. (high) 5°+1°=6°
E. Roll angle 5°±1°
E1. (low) 5°−1°=4°
E2. (high) 5°+1°=6°
F. Yaw angle−10°±1°
F1. (low) −10°−1°=−9°
F2. (high) −10°+1°=−11°

Combining all cases of these 6 parameters can yield, for example, 64 images ($2^6$=64). In accordance with an exemplary embodiment, each of the 64 images can be generated using affine or perspective transform algorithms, and all 64 images can be used.

In step 550, captured images are selected to fit into a mosaic image, wherein identification methods such as matching contrasts or phase only correlation can be used to the previously provided top level image at the position of the top level image indicated by the transformed image position, for example, an offset from a known location or locations on the top level image may be calculated using known ground distances.

In accordance with an exemplary embodiment, to check for the best possible match, suitable error metrics such as the least squares solution using the sum of squared differences can be used, such as Szeliski, R (2004) Image Alignment and Stitching: A Tutorial, Microsoft Research Technical Report MSR-TR-2004-92. Matching tie points can be used for this step that exist in the top level image, the image adjacent to the current image (if any) and the current image to be stitched into the mosaic as done in traditional stitching methods. Matching tie points can include features such as roads, or regular patterns such as agricultural crop rows.

In accordance with an exemplary embodiment, in step 560, the best match can be found (lowest error metric) from the set of 64 images and the parameters from this image can be used to set the nominal position, altitude, pitch, roll, and yaw for the next iteration. For example, assume that the image with parameters N39°19.979, W098°53.763, altitude 95 m, pitch angle 4°, roll angle 4°, and yaw angle −11° was the best match, then the nominal value would be set to these parameters for the next iteration.

In step 570, if the image fit error metric is lower than a predefined threshold value, the process for the current image is complete, and the process proceeds to step 580. In step 580, if the error metric is greater than the predefined threshold value, the value of offset $x[n]$ is compared to a predefined offset threshold value. If the offset $x[n]$ is less than the offset threshold, the process for the current image is complete, and the process proceeds to step 600.

If the offset it greater than the offset threshold, the process continues to step 590, where the offset $x[n]$ can be divided, for example, by 2. For example, in accordance with an exemplary embodiment, a bisection search method can be used to converge on a solution for the best match for an image to the top level image, and the process continues to step 540. For example, the offset x[n] would be reduced by half to 0.5° for yaw, pitch and roll angles, the elevation 2.5 m, and the location 0.0025' for the first iteration.

In accordance with an exemplary, steps 540-590 for all images captured by the aerial vehicle. Images that do not contain a portion of the agricultural field to be captured (for example, during take-off, landing, or during aerial vehicle turns at the edges of the field, or with pitch or roll angles that create images that are not in the agricultural field (for example, the sky, neighboring land, etc.)), can be discarded and are not used for this process.

In accordance with an exemplary embodiment, a computer program product is disclosed comprising a non-transitory computer readable medium having a computer readable code embodied therein for stitching aerial data using information from at least one previous image, the computer readable program code configured to execute a process, which includes the steps of: providing a top level image of a landscape from the at least one previous image; capturing a plurality of images of the landscape and storing the plurality of images with image metadata, the image metadata including at least one or more of the following parameters: latitude and longitude, altitude, pitch angle, roll angle, and yaw angles; generating a set of transformed images based on the image metadata, wherein generating the set of transformed images based on the image metadata comprises: setting a variable for each of the parameters; and calculating quality of fit for each of the plurality of images; normalizing the plurality of captured images using the set of transformed images; and assembling a new aerial image based on the plurality of captured images by fitting the plurality of normalized captured images to the top level image.

The non-transitory computer usable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

The present invention includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to".

In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure.

In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A method of stitching aerial data using information from at least one previous image, the method comprising:
   providing a top level image of a landscape from the at least one previous image;
   capturing, by a camera installed on an aerial vehicle, a plurality of images of the landscape;
   obtaining, from sensors installed on the aerial vehicle, image metadata for each of the captured images, the image metadata including parameters relating to an altitude of the aerial vehicle, a latitude of the aerial vehicle, a longitude of the aerial vehicle, a pitch angle of the aerial vehicle, a roll angle of the aerial vehicle, and a yaw angle of the aerial vehicle; and
   generating, for each of the captured images, a set of 64 transformed images based on the image metadata, comprises:
      setting a variable for each of the parameters, the variable being a plus variable and a minus variable for each of the parameters;
      preparing a plurality of sets of transformed image metadata by applying the variables to the parameters; and
      preparing the set of 64 transformed images from the captured image based on the plurality of sets of transformed image metadata, respectively;
   identifying, for each set of 64 transformed images, one of the transformed images by calculating quality of fit to the top level image for each of the transformed images; and
   assembling a new aerial image based on the plurality of the identified transformed images.

2. The method of claim 1, the identifying step comprising: selecting the transformed image with the quality of fit meeting a fit threshold, wherein if the quality of fit threshold is not met, resetting the variable for each of the parameters.

3. The method of claim 1, the identifying step comprising: using existing landmarks to fit the plurality of captured images to the top level image.

4. The method of claim 1, the identifying step comprising: detecting relative size differences in crop row distances or distance between plants or other objects with known separation or dimensions using aerial pitch and roll.

5. The method of claim 4, the identifying step comprising: removing images of irrigation or farm equipment that covers crop to be imaged using pixel replication or pixels from previously captured image in a same geographic location of an agricultural field.

6. The method of claim 5, the identifying step comprising: detecting irrigation or farm equipment covering crops during aerial imaging using known patterns or colors.

7. The method of claim 1, wherein the camera is a multispectral imaging camera, the aerial vehicle is an unmanned aerial vehicle, and flying the unmanned aerial vehicle at a height of 100±5 meters above ground level (AGL).

8. A computer program product comprising a non-transitory computer readable medium having a computer readable code embodied therein for stitching aerial data using information from at least one previous image, the computer readable program code configured to execute a process, which includes the steps of:
provim a top level image of a landscape from the at least one previous image;
capturing, by a camera installed on an aerial vehicle, a plurality of images of the landscape;
obtaining, from sensors installed on the aerial vehicle, image metadata for each of the captured images, the image metadata including parameters relating to an altitude of the aerial vehicle, a latitude of the aerial vehicle, a longitude of the aerial vehicle, a pitch angle of the aerial vehicle, a roll angle of the aerial vehicle, and a yaw angle of the aerial vehicle;
generating, for each of the captured images, a set of 64 transformed images based on the image metadata, comprises:
setting a variable for each of the parameters, the variable being a plus variable and a minus variable for each of the parameters;
preparing a plurality of sets of transformed image metadata by applying the variables to the parameters; and
preparing the set of 64 transformed images from the captured image based on the plurality of sets of transformed image metadata, respectively;
identifying, for each set of 64 transformed images, one of the transformed images by calculating quality of fit to the top level image for each of the transformed images; and
assembling a new aerial image based on the plurality of the identified transformed images.

9. The computer program product of claim 8, the identifying step comprising:
selecting the transformed image with the quality of fit meeting a fit threshold, wherein if the quality of fit threshold is not met, resetting the variable for each of the parameters.

10. The computer program product of claim 8, the identifying step comprising:
using existing landmarks to fit the plurality of captured images to the top level image.

11. The computer program product of claim 8, the identifying step comprising:
detecting relative size differences in crop row distances or distance between plants or other objects with known separation or dimensions using aerial pitch and roll.

12. The computer program product of claim 8, the identifying step comprising:
removing images of irrigation or farm equipment that covers crop to be imaged using pixel replication or pixels from previously captured image in a same geographic location of an agricultural field.

13. The computer program product of claim 8, the identifying step comprising:
detecting irrigation or farm equipment covering crops during aerial imaging using known patterns or colors.

14. A system for stitching aerial data using information from at least one previous image, the system comprising:
an aerial vehicle configured to:
capture, a plurality of images of an area at a plurality of intervals with a multispectral imaging camera; and
obtain, from sensors installed on the aerial vehicle, image metadata for each of the captured images, the image metadata including parameters relating to an altitude of the aerial vehicle, a latitude of the aerial vehicle, a longitude of the aerial vehicle, a pitch angle of the aerial vehicle, a roll angle of the aerial vehicle, and a yaw angle of the aerial vehicle; and
a computer configured to:
provide a top level image of a landscape from the at least one previous image;
generate, for each of the captured images, a set of 64 transformed images based on the image metadata, comprises:
setting a variable for each of the parameters, the variable being a plus variable and a minus variable for each of the parameters;
preparing a plurality of sets of transformed image metadata by applying the variables to the parameters; and
preparing the set of 64 transformed images from the captured image based on the plurality of sets of transformed image metadata; and
identify, for each set of 64 transformed images, one of the transformed images by calculating quality of fit to the top level image for each of the transformed images; and
assemble a new aerial image based on the plurality of the identified transformed images.

15. The system of claim 14, wherein the parameters are captured using one or more of the following:
a GPS sensor;
a pressure altimeter;
pitch and roll sensors; and
a magnetometer.

16. The system of claim 15, wherein the computer in the identifying step is configured to:
select the transformed image with the quality of fit meeting a fit threshold, wherein if the quality of fit threshold is not met, reset the variable for each of the parameters.

17. The system of claim 15, wherein the computer in the identifying step is configured to:
use existing landmarks to fit the plurality of captured images to the top level image.

18. The system of claim 15, wherein the computer in the identifying step is configured to:
detect relative size differences in crop row distances or distance between plants or other objects with known separation or dimensions using aerial pitch and roll.

19. The system of claim 18, wherein the computer in the identifying step is configured to:
remove images of irrigation or farm equipment that covers crop to be imaged using pixel replication or pixels from previously captured image in a same geographic location of an agricultural field.

20. The system of claim 19, wherein the computer in the identifying step is configured to:
detect irrigation or farm equipment covering crops during aerial imaging using known patterns or colors.

* * * * *